United States Patent
Esselink et al.

(12) 
(10) Patent No.: US 6,712,173 B2
(45) Date of Patent: Mar. 30, 2004

(54) SNOWMOBILE REMOTE THROTTLE CONTROL

(76) Inventors: Troy Esselink, Box 715, Princeton British Columbia (CA), V0X 1W0; Brett Bottcher, Box 1349, Princeton British Columbia (CA), V0X 1W0

(*) Notice: Subject to any disclaimer, the term of this patent is extended or adjusted under 35 U.S.C. 154(b) by 123 days.

(21) Appl. No.: 10/102,719

(22) Filed: Mar. 22, 2002

(65) Prior Publication Data

US 2002/0096381 A1 Jul. 25, 2002

Related U.S. Application Data

(63) Continuation-in-part of application No. 09/506,293, filed on Feb. 18, 2000, now abandoned.
(60) Provisional application No. 60/121,308, filed on Feb. 13, 1999.

(51) Int. Cl.⁷ .................................................. B62D 51/00
(52) U.S. Cl. .................. 180/319; 180/315; 180/320; 180/321; 74/502.2
(58) Field of Search .......................... 74/478, 482, 489, 74/494, 500.5, 502.6, 502.2, 501.5 R, 501.6, 512; 60/906; 180/182, 190, 315, 319, 320, 321, 335, 181, 7.5, 19.1, 19.2, 19.3, 20

(56) References Cited

U.S. PATENT DOCUMENTS

| | | | | | |
|---|---|---|---|---|---|
| 3,580,100 | A | | 5/1971 | McDermott | |
| 3,583,506 | A | * | 6/1971 | Preble | 180/335 |
| 4,307,788 | A | * | 12/1981 | Shelton | 180/181 |
| 4,630,703 | A | * | 12/1986 | Fletcher | 180/219 |
| 4,714,140 | A | * | 12/1987 | Hatton et al. | 180/20 |
| 4,899,610 | A | * | 2/1990 | Bourret | 74/489 |
| 5,560,441 | A | * | 10/1996 | Moody et al. | 180/7.5 |
| 5,950,754 | A | * | 9/1999 | Ondrish, Jr. | 180/181 |
| 6,176,219 | B1 | * | 1/2001 | Culbertson | 123/399 |
| 6,241,296 | B1 | * | 6/2001 | Crabtree et al. | 294/1.1 |
| 6,510,759 | B2 | * | 1/2003 | Johnson | 74/502.4 |
| 2002/0056408 | A1 | * | 5/2002 | Dec et al. | 114/55.56 |

FOREIGN PATENT DOCUMENTS

CA  2299064  * 8/2000

* cited by examiner

Primary Examiner—Lesley D. Morris
Assistant Examiner—Daniel Yeagley
(74) Attorney, Agent, or Firm—Antony C. Edwards

(57) ABSTRACT

A remote throttle control device for snowmobiles includes a throttle coupler for releasable mounting to a snowmobile throttle controller. The throttle coupler mounts to a first end of a flexible push/pull cable. A manually operable remote actuator is mounted to an opposite second end of the push/pull cable. The remote actuator is for pushing or pulling the push/pull cable, so as to respectively push or pull the throttle coupler for actuation of the throttle controller when the throttle coupler is mounted to the throttle controller. The remote actuator is mounted to a pull handle. A strap is mountable at one end to the handle and at its opposite end to the ski of the snowmobile so that the ski may be pulled on by a user while the user simultaneously remotely controls the snowmobile throttle.

6 Claims, 9 Drawing Sheets

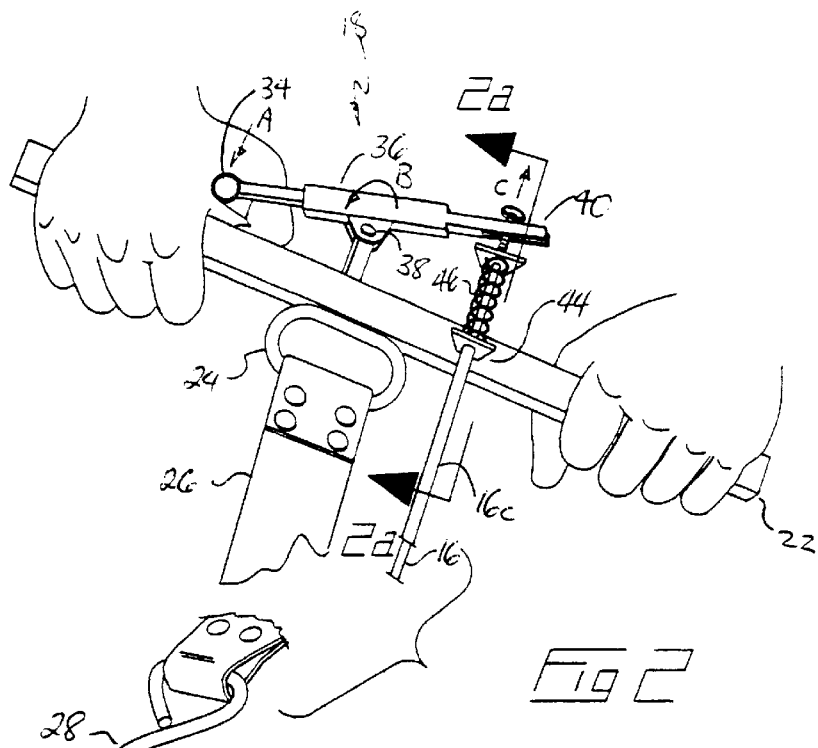
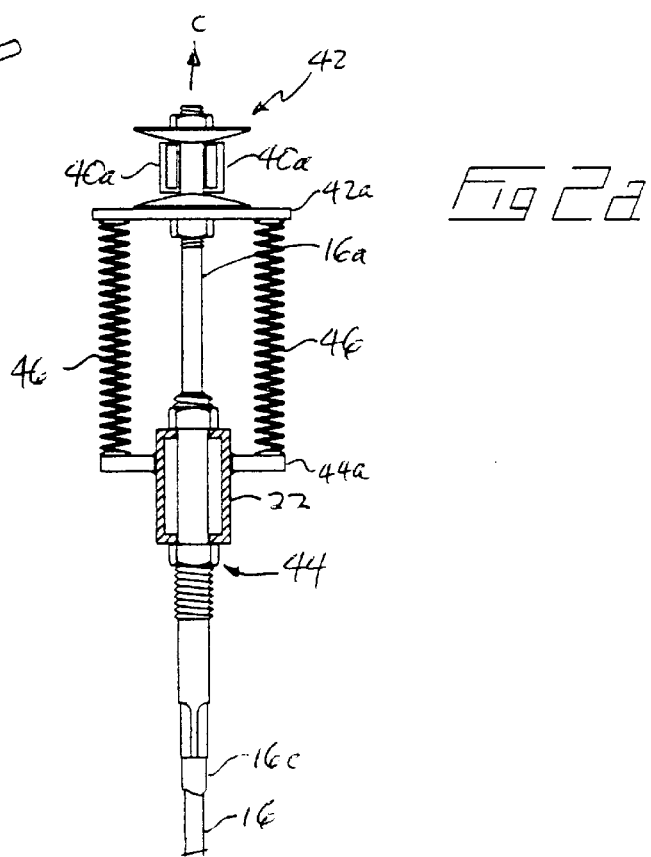
Fig 2
Fig 2a

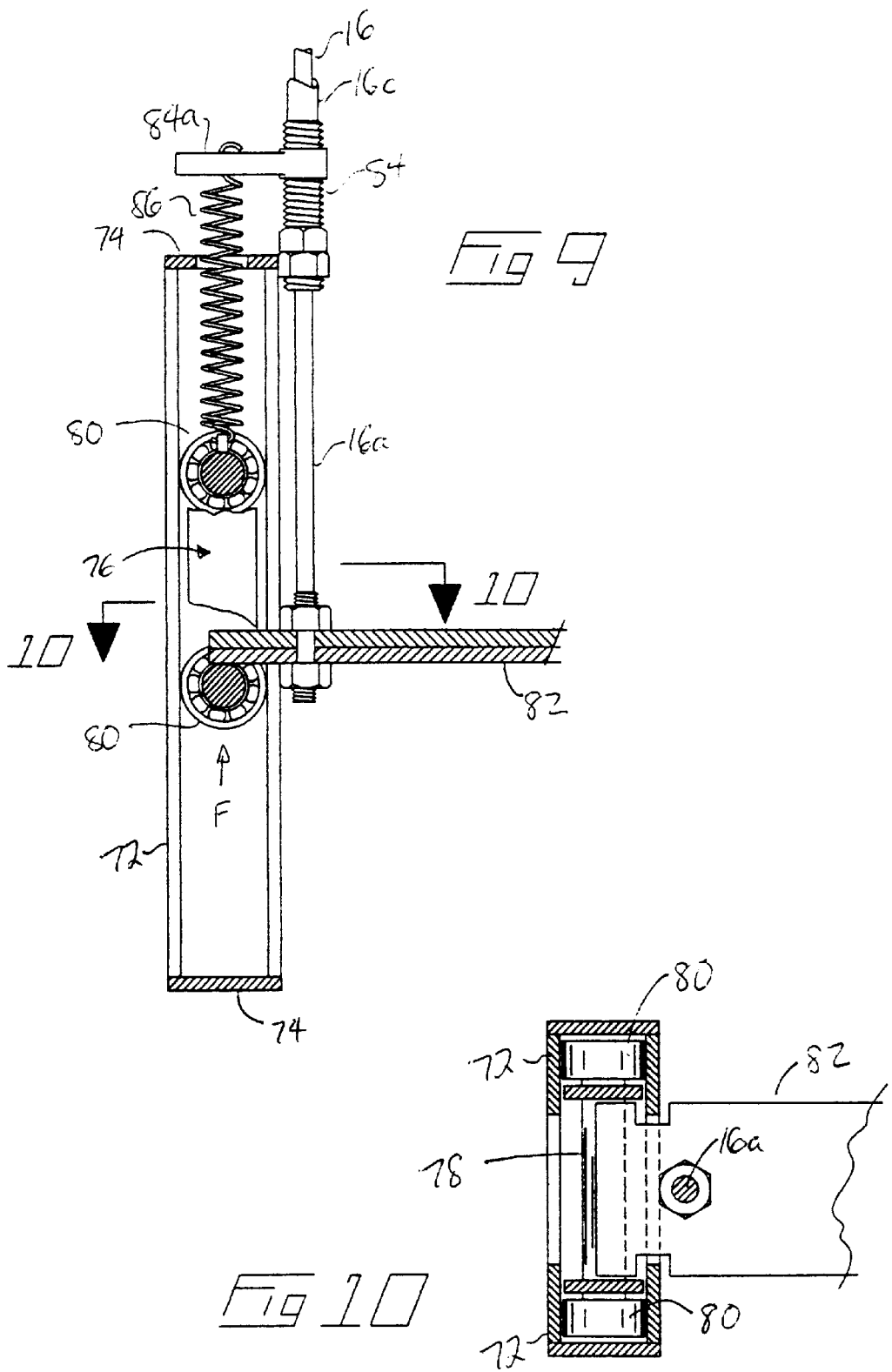

SNOWMOBILE REMOTE THROTTLE CONTROL

CROSS REFERENCE TO RELATED APPLICATION

This application is a Continuation-in-Part from U.S. patent application Ser. No. 09/506,293 filed Feb. 18, 2000 now abandoned which claims priority from United States Provisional Patent Application No. 60/121,308 filed Feb. 23, 1999 titled Snowmobile Remote Throttle Control.

Field of the Invention

This invention relates to the field of throttle controls for recreational vehicles such as snowmobiles, and in particular to a mechanism which allows for the throttle control of such vehicles from a remote location.

BACKGROUND OF THE INVENTION

Snowmobiling is a very popular recreational pastime. One drawback of snowmobiles, however, is that they sometimes get stuck. When this occurs, because snowmobiles are heavy, they are very difficult to manoeuvre. Often what is required is that the operator, who is often alone, must walk to the front of the snowmobile and try to free the snowmobile by pulling on the front skids or otherwise on the front end of the snowmobile. It is often advantageous in assisting freeing the snowmobile to have a second person operate the throttle of the snowmobile as the snowmobile operator is tugging on the front end to thereby gain the assistance of the snowmobile's motivating force as the front skis are dislodged. It is also advantageous to be able to control the throttle by foot pressure rather than solely by use of a thumb control.

When however the operator is alone, it is not possible to simultaneously pull on the front of the snowmobile and operate the snowmobile throttle which is typically located as a thumb controlled lever on the snowmobile handle bar.

Consequently, it is an object of the present invention to provide a remote control device for remotely actuating the snowmobile throttle, and in particular, remotely operating the throttle by an operator standing in front of or behind the snowmobile. It is also advantageous to be able to control the throttle by foot pressure rather than solely by use of a thumb control.

In the prior art, applicant is aware of various innovations to do with throttle mechanisms on snowmobiles and like recreational vehicles, however, these are restricted to throttles affixed to the recreational vehicle in the usual position and manner. As an example, application is aware of the following patents: U.S. Pat. No. 4,237,997 which issued Dec. 9, 1980 to Swanson for a Switch and Throttle Lever Combination for Use in Conjunction with Snowmobile Engine Speed Limiting System, U.S. Pat. No. 5,829,312 which issued to Berg et al on Nov. 3, 1998 for a Progressive Throttle Lever, and Canadian Patent No. 1,279,557 which issued Jan. 29, 1991 to Bourret for a Throttle Lever.

U.S. Pat. No. 3,580,100 which issued to McDermott teaches providing a driving instructor with handles which may be actuated to pull a cable so as to remotely and entirely disengage the throttle mechanism of an automobile. No throttle speed control is given to the instructor so that when the instructor decides to over-ride a student's throttle input, by actuating the handles, the hook (78) on the cable actuated bell crank (72) entirely disengages from the aperture (106) in the inner plate-like slide (40) thereby allowing the throttle valve control arm (18) to move to the idle position under the biasing action of a spring (114). Thus the instructor's control over the throttle is entirely removed as the throttle returns to idle until the student removes his or her foot from the accelerator pedal so as to allow foot throttle control to be reconnected by re-engaging of the bell crank with the slide.

SUMMARY OF THE INVENTION

The remote throttle control device is for mounting on snowmobiles. The device is not intended to include the snowmobile per se, with exception perhaps of only the throttle thumb-lever. The device includes a throttle coupler which is for releasable mounting to a snowmobile throttle thumb lever or which is build into the lever as an integral component. The throttle coupler is mountable to a first end of a flexible push/pull cable. A remote actuator is mountable to the opposite second end of the push/pull cable, opposite the first end. The remote actuator is for pushing or pulling the push/pull cable, so as to respectively push or pull the throttle coupler. When the throttle coupler is mounted to the thumb lever, or formed as part of the thumb lever, pushing or pulling on the cable rotates the thumb lever to accelerate or decelerate the snowmobile's motor.

The remote throttle actuator is mounted to a handle adapted for grasping and pulling by a user. A tether is releasably mounted to the handle. The tether is adapted for releasable mounting, for example by a hook, to a ski of the snowmobile.

The embodiment gives the user all the advantages of a remote throttle controller plus allows the user to pull with both hands, control the throttle, and stand in an upright position while running the snowmobile. One advantage is the added pulling power a user may achieve. The user uses their body as a counter-weight for added pulling power. Applicant's believe that this allows the user to apply seventy-five to one hundred percent more pulling power than the user ordinarily would have by merely pulling on the ski, for example because the user is not bent over trying to pull on the ski. There is no way to get any leverage when you are bent over, and many skis can be hard on the hands as they are not designed to be pulled on. The throttle and hook strap gives you added length from where you would normally grab the ski. This is nothing short of a total back saver for a lot of situations. It works especially well when you are standing at a level higher than the snowmobile; we are faced with this type of situation more often than not. Ninety-five percent of the time you will be able to stand totally upright which is not hard on your back at all. The hook/strap is removable from the hand throttle attachment, so it will be out of the way for situations with no heavy pulling needed. The applicants believe this new attachment is equal to having three people pulling and operating the throttle. Normally with three people you would have two people pull and one run the throttle. This may now be achieved single-handedly.

The throttle coupler may be a rigid lever arm mountable at a first end thereof to, or formed as part of the thumb lever, and at an opposite second end thereof to the first end of the push/pull cable. The throttle coupler may further comprise a rigid mounting arm for mounting an end of the conduit to the snowmobile adjacent the lever arm.

BRIEF DESCRIPTION OF THE DRAWINGS

FIG. 2 is an enlarged perspective of the snowmobile remote throttle control in the actuated position, opening the throttle, and illustrating one method for releasable attachment of the manipulation strap to a ski.

FIG. 2a is a sectional view taken on line 2a—2a of FIG. 2.

FIG. 9 is a sectional view taken on line 9—9 of FIG. 8.

FIG. 10 is a sectional view taken on line 10—10 of FIG. 9.

DETAILED DESCRIPTION OF EMBODIMENTS OF THE INVENTION

Figure 1:
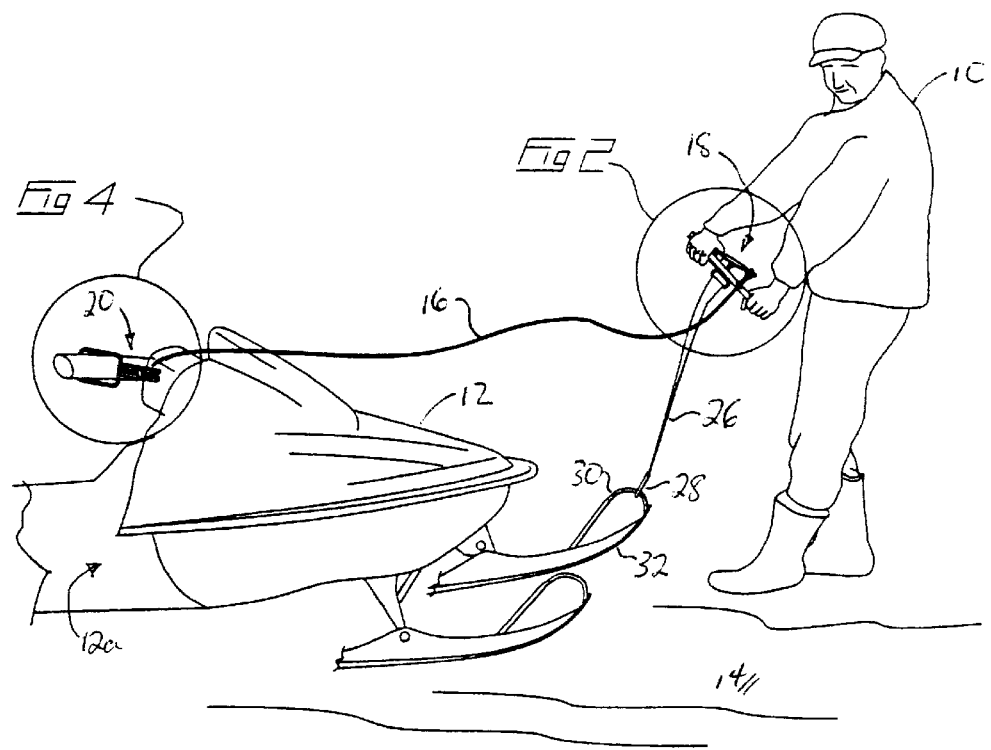
FIG. 1, is a perspective view of the remote throttle control of the present invention connected to the hand throttle of a Snowmobile, with the manipulation strap removably attached to a ski of the Snowmobile.
Figure 3:
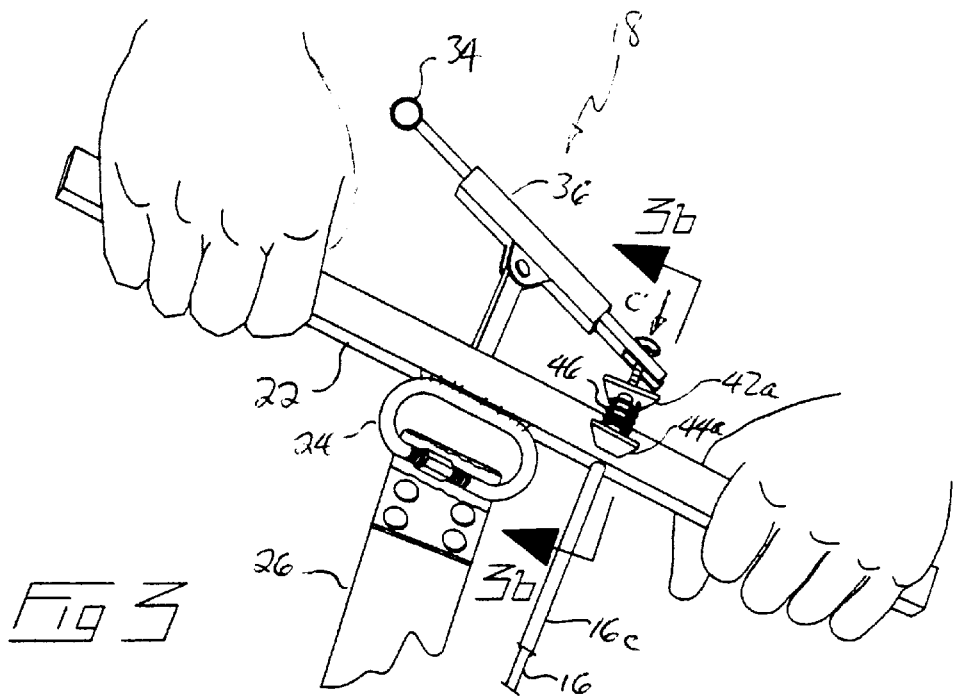
FIG. 3 is an enlarged perspective of the snowmobile remote throttle control in the neutral position, prior to throttle actuation, illustrating one method of releasable attachment of the manipulation strap.
Figure 4:
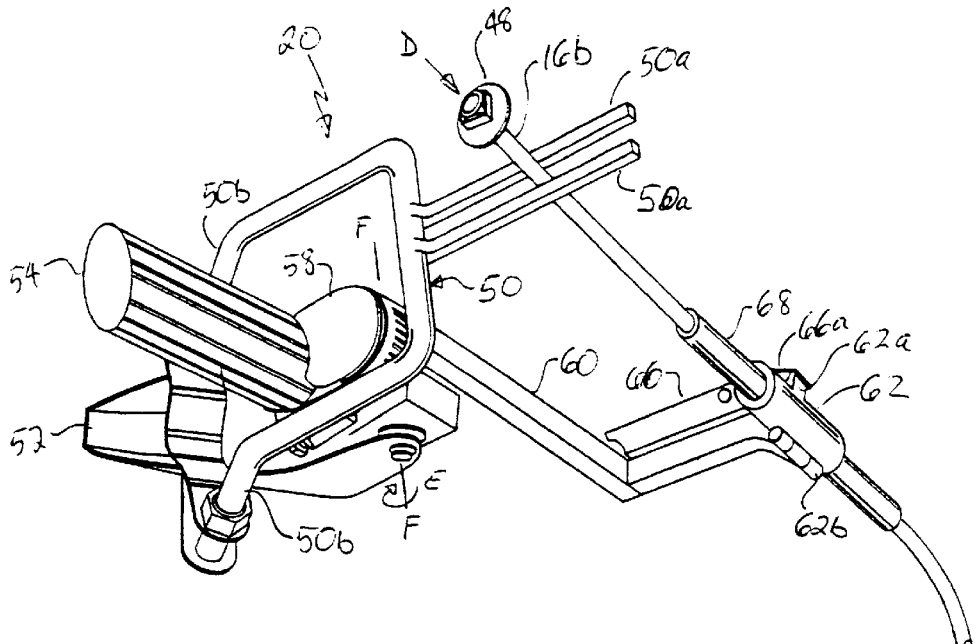
FIG. 4 is a perspective view of the throttle cable coupler and throttle actuator secured to the snowmobile throttle handle.
Figure 5:
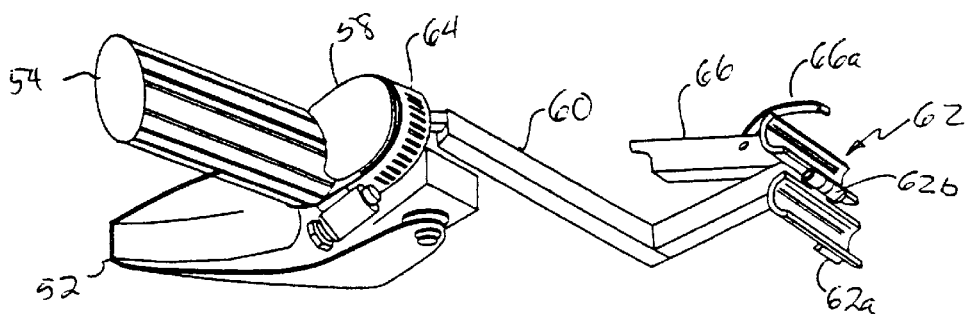
FIG. 5 is a perspective view of the throttle cable coupler only secured to the Snowmobile throttle handle.
Figure 6:
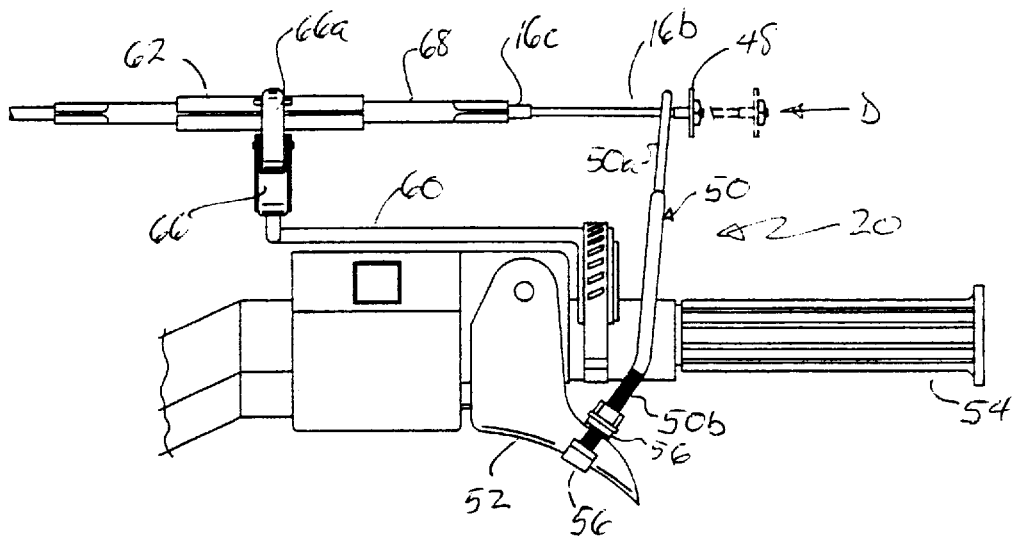
FIG. 6 is a plan elevation view of the throttle cable coupler and throttle actuator in the neutral position with the cable extended outwardly to limit throttle travel in the actuated direction.

FIG. 1 depicts a user 10 working to free a snowmobile 12 which has become stuck in snow 14 employing the remote throttle actuator of the present invention. The remote throttle actuator includes a sheathed cable 16 which extends from a remote end mounted to a manual cable actuator 18 such as better seen in FIGS. 2 and 3 to an opposite end where it mounts to a throttle thumb lever actuator 20 as better seen in FIGS. 4–6.

Manual cable actuator 18 includes handlebar 22 which may as illustrated be grasped using two hands on either side of a strap coupler such as D ring 24 mounted medially along handlebar 22. A flexible strap or tether 26 is mounted to D ring 24, hook 28 being mounted at its distal end. Hook 28 is sized for releasably hooking onto snowmobile 12, for example onto one of the conventional skis or support struts 30 of snowmobile skis 32. Tether 26 is of sufficient length so that, with hook 28 hooked on to strut 30, user 10 may while standing upright grasp handlebar 22 so as to comfortably tension tether 26 by pulling on the handlebar to assist in freeing snowmobile 12. Simultaneously, user 10 may actuate manual cable actuator 18 by urging handle 34 of bell crank 36 in direction A towards handle 22 so as to rotate bell crank 36 in direction B about pivot 38 rigidly mounted medially along handle 22 opposite to D ring 24.

Rotation of bell crank 36 in direction B by the urging of handle 34 in direction A towards handlebar 22, correspondingly urges forked end 40 of bell crank 36 in direction C away from handlebar 22.

Figure 3A:
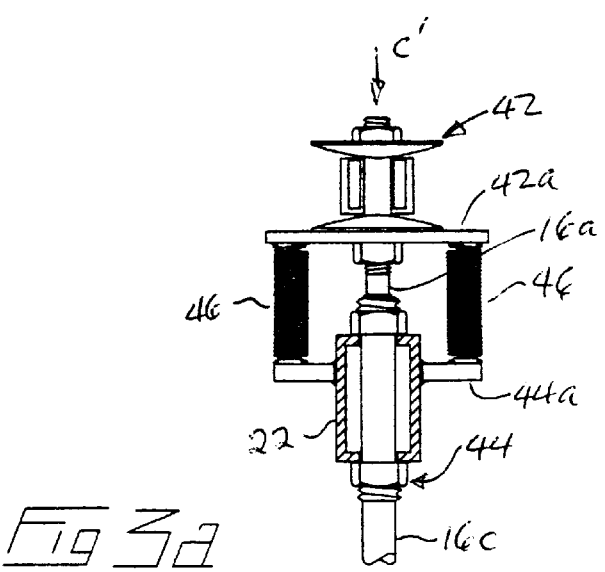
FIG. 3a is a sectional view taken on line 3a—3a of FIG. 3.

As better seen in FIGS. 2a and 3a, coupler 42 mates between the parallel tines 40a of forked end 40. Coupler 42, which may comprise a pair of washers snugly bolted onto a common through-shaft journalled through the washers, is rigidly mounted to cable end 16a of sheathed cable 16. Thus, because the sheath 16c through which cable 16 may slide is rigidly mounted by sheath coupler 44 which in turn is rigidly mounted to handlebar 22, translation of coupler 42 in forked end 40 in direction C thereby pulls cable end 16a thereby sliding the entire length of cable 16 relative to sheath 16c.

A pair of helically coiled springs 46 are mounted at their ends so as to extend parallel on either side of cable end 16a between a pair of rigid cross braces 42a and 44a. Brace 42a is rigidly mounted to coupler 42. Cross brace 44a is rigidly mounted to handlebar 22.

As better seen in FIG. 3a, springs 46 when in their non-deformed state retain cable end 16a slid substantially completely into sheath coupler 44 and the corresponding end of sheath 16c. This corresponds to the return position of bell crank 36. For example, when user 10 has released handle 34, springs 46 resiliently urge coupler 42 towards sheath coupler 44 in direction C', opposite to direction C, thereby sliding cable end 16a into sheath 16c so as to correspondingly slide cable 16 through sheath 16c. Thus as may be seen, manual actuation of handle 34 so as to rotate bell crank 36 in direction B pulls cable end 16a from sheath 16c against the resilient return biasing force of helical springs 46.

Figure 5A:
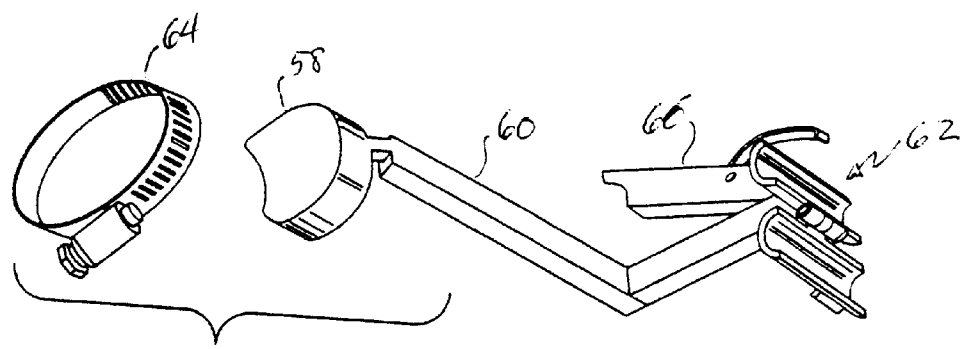
FIG. 5a is an exploded perspective view of the components of the throttle cable coupler.
Figure 5B:
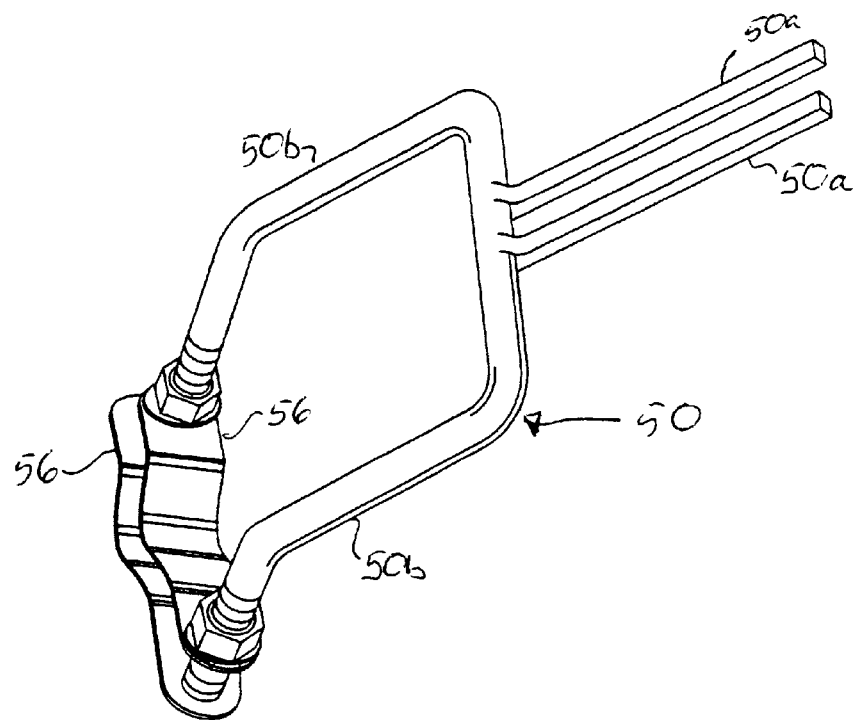
FIG. 5b is a perspective view of the throttle actuator.

Sliding translation of cable 16 simultaneously pulls the opposite end of cable 16, that is end 16b, in direction D. A stop 48, such as the nut and washer arrangement illustrated, is rigidly mounted on to the distal end of cable end 16b. Thus, with cable end 16b releasably and slidably mounted between the parallel rigid tines 50a of fork 50, translation of cable end 16b in direction D engages stop 48 against tines 50a. Fork 50, better seen in FIG. 5b is adapted for mounting onto a conventional throttle thumb lever 52 as would normally be found mounted to snowmobile handlebar 54 for the conventional operation of snowmobile 12. Fork 50 has a pair of rigid arms 50b extending generally parallel to, in oppositely disposed relation from tines 50a. Arms 50b are spaced apart sufficiently so that fork 50 may be placed as a yoke over handlebar 54, thereby placing handlebar 54 between arms 50b. The distal ends of arms 50b may be threaded so that a pair of clamping members may be rigidly mounted across the ends of arms 50b.

Figure 6A:
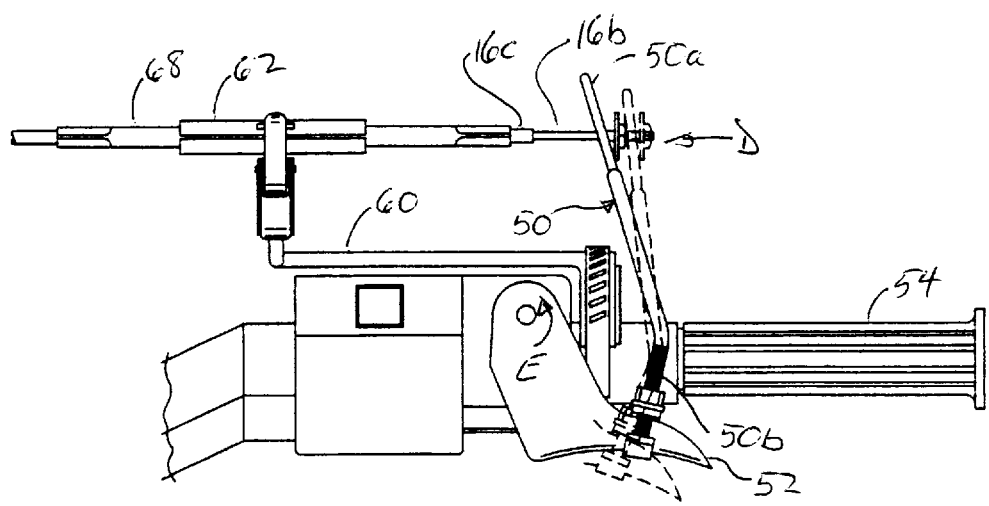
FIG. 6a is a plan elevation view of the throttle cable coupler and throttle actuator in the actuated position.
Figure 7:
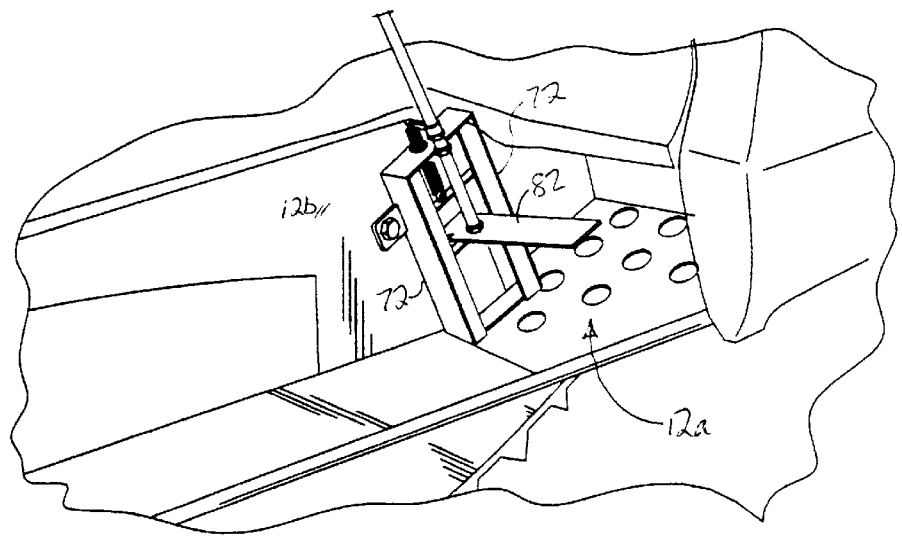
FIG. 7 is a perspective view of the foot operated remote throttle actuator.
Figure 8:
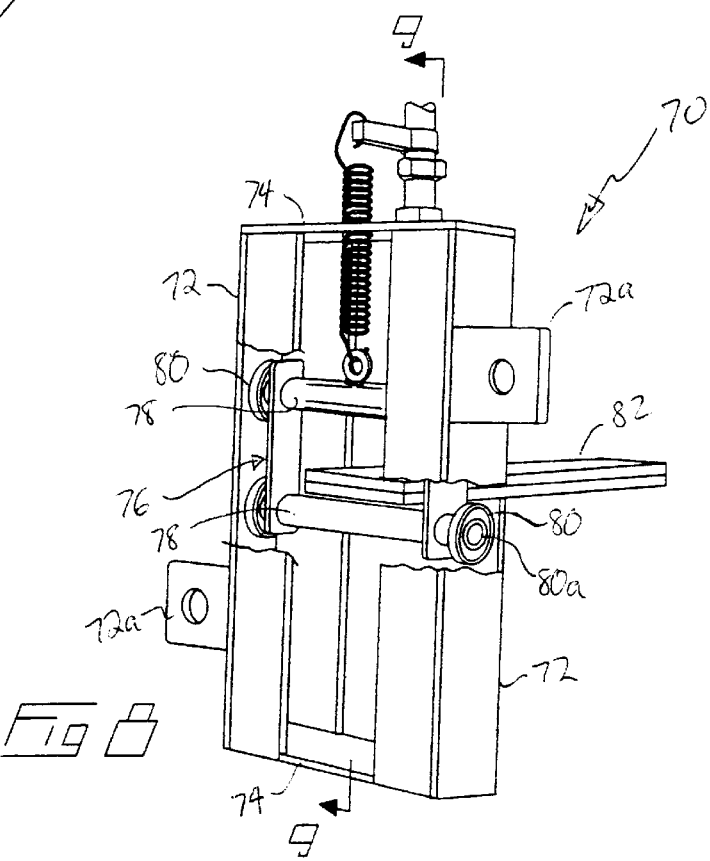
FIG. 8 is a perspective view, partially cut-away of the rear side of the foot operated remote throttle actuator.

Fork 50 may thus be rigidly mounted on to thumb lever 52 by clamping thumb lever 52 between clamping members 56 when clamping members 56 are rigidly mounted on to the threaded ends of arms 50, for example by means of the threaded nuts illustrated. With thumb lever 52 thus rigidly sandwiched between clamping members 56, where clamping members 56 may be conformally bent or curved so as to provide a better fit on to thumb lever 52, as seen in FIG. 6a sliding translation of cable end 16b into sheath 16c in direction D rotates fork 50 in direction E about the axis of rotation F of thumb lever 52.

Cable end 16b and the corresponding end of sheath 16c are held mounted so as to dispose cable end 16b between tines 50a of fork 50 by the use of a clamp arrangement mounted to handlebar 54. In particular, as better seen in FIG. 5a, the clamp arrangement includes a curved base 58, curved to snugly fit onto and partially around handlebar 54. A cantilevered L-shaped arm 60 is rigidly mounted at one end to base 58 so as to extend away from thumb lever 52. A releasable clamshell clamp 62 is rigidly mounted to the other end of L-shaped arm 60. Thus, as seen in FIG. 5, with base 58 mounted to the snowmobile's handlebar 54, for example by means of a flexible collar clamp 64, clamshell clamp 62 may be opened by release of over-center latch 66. A cylindrical rigid sheath mount 68 may then be releasably clamped within clamshell clamp 62 by engaging latch arm 66a with catch 62a thereby holding shut the two clamshell halves of clamshell clamps 62 once rotated into their closed position about their common hinge 62b.

Sheath mount 68 holds sheath 16c rigid relative to the clamping arrangement of clamshell clamp 62, L-shaped arm 60 and base 58. Thus, when a user depresses handle 34 on bell crank 36 so as to translate cable end 16a in direction C, because cable 16 is a flexible but substantially non-resilient cable, cable end 16b is immediately drawn in direction D into sheath 16c. Depending on how far stop 48 has to travel in direction D before engaging tines 50a of fork 50, this distance being adjustable according to the preferences of the user (this acting as a throttle governor adjustment), rotation of handle 34 through its full available arc of rotation between its non-depressed position in FIG. 3 and its fully depressed position in FIG. 2 thereby translates into rotation of thumb lever 52 through at least a portion of its available rotation in direction E. Rotation of thumb lever 52 in direction E then accelerates the snowmobile motor in the normal manner turning the snowmobile's drive track as the snowmobile's clutch engages.

Thus user 10 may while simultaneously pulling on at least one of the snowmobiles skis via a tether or tethers 26, apply increasing throttle to the snowmobile motor to commence rotation of the snowmobile drive track to thus free a stuck snowmobile by the combined actions.

A complimentary embodiment is illustrated in FIGS. 7–10 wherein a foot pedal arrangement 70 is mounted into the footwell 12a of snowmobile 12, and in particular to side wall 12b to allow for foot operated remote actuation of thumb lever 52. In this embodiment, manual cable actuator 18 is replaced with foot pedal arrangement 70 so as to cooperate with cable end 16a. In this embodiment, a parallel pair of opposed facing rigid channels 72 are mounted between rigid end plates 74 so as to form a rectangular wheel race housing. A wheel mounted foot pedal shuttle 76, formed by a parallel pair of rigid cross members 78 on which are mounted oppositely disposed pairs of wheels 80, is free to run along the length of channels 72. A cantilevered foot pedal 82 is rigidly mounted to the lower of cross members 78 so as to extend generally perpendicularly from the shuttle housing defined by the channels. Foot pedal 82 may be formed of two over-laid sheets of metal, and cross members 78 may be cylindrical tubes housing wheel shafts 80a. Alternatively, wheels 80 may, as better seen in FIG. 9, be roller bearings mounted on the opposite ends of cross members 78.

Sheath 16c is rigidly held in sheath mount 84 and sheath mount 84 is rigidly mounted to the upper end plate 74. The upper end plate 74 may have an aperture therethrough to allow a helical coiled spring 86 to extend between the upper end of shuttle 76 and rigid flange 84a mounted to sheath mount 84. Coil spring 86 is sized so as to urge shuttle 76 in direction F so as to provide a resilient return biasing force against the translation of shuttle 76 along channels 72 by a user's foot depressing foot pedal 82. Thus depression of the foot pedal in a direction opposite to direction F pulls cable end 16a from within sheath 16c thereby actuating, in the manner of manual cable actuator 18, the rotation of fork 50 to correspondingly rotate thumb lever 52. Thus with channels 72 bolted to snowmobile side wall 12b for example by the use of apertured flanges 72a rigidly mounted to channel 72, a user may merely rely on foot pressure applied to foot pedal 82 to control the snowmobile throttle.

Figure 11:
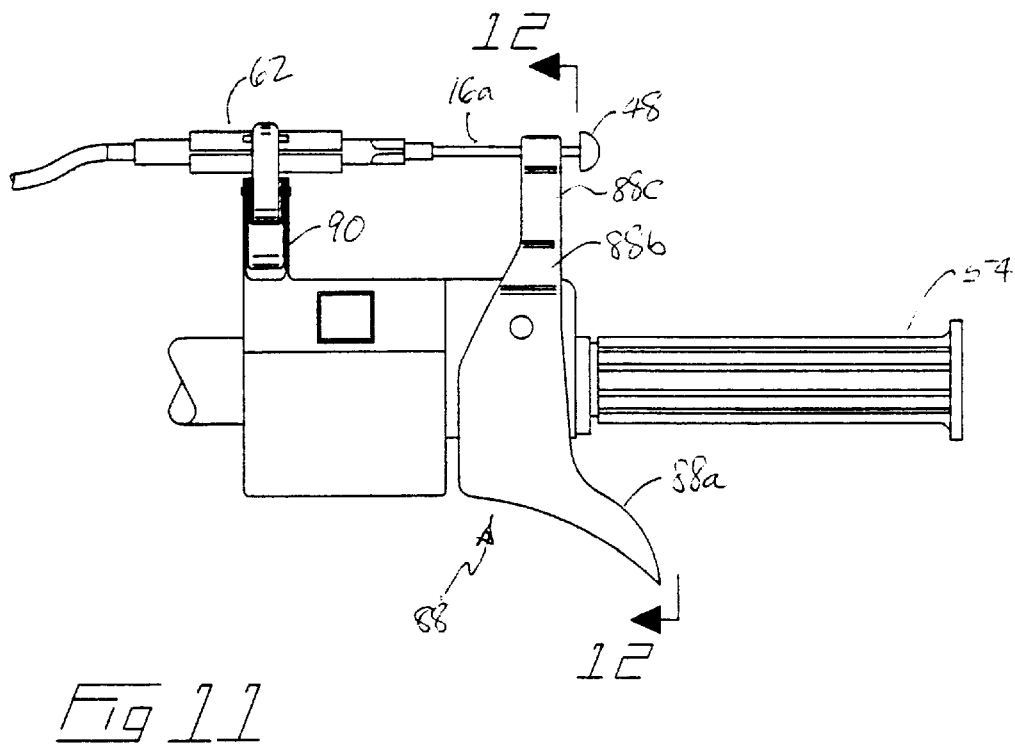
FIG. 11 is a plan elevation view of one aspect of the throttle cable coupler and throttle actuator integrally formed with the snowmobile hand grip.
Figure 12:
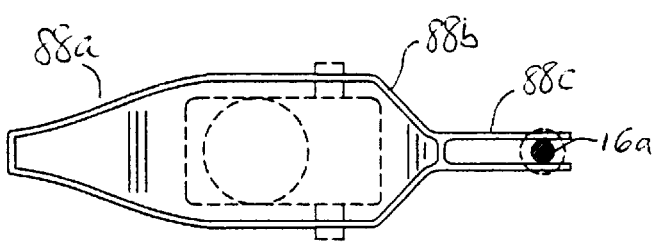
FIG. 12 is a sectional view taken on line 12—12 of FIG. 11.

In the further embodiment of FIGS. 11 and 12, fork 50 and thumb lever 52 are replaced with a single unitary modified thumb lever 88 which combines a cantilevered thumb lever component 88a with a fork extension 88b rigidly supporting a parallel pair of rigid tines 88c. Cable end 16a is mountable between tines 88c in the same manner as the cable end was mountable between tines 50a. In this embodiment, base 58 and L-shaped arm 60 may be replaced by merely a rigid arm member 90 formed as part of the housing to which thumb lever 88 is mounted, arm member 90 rigidly supporting clamshell clamp 62 for operation as before.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A remote snowmobile throttle control device mountable to the throttle thumb lever of a snowmobile, the remote snowmobile throttle control device comprising:

a control lever adapted for mounting, by mounting means, to the thumb lever, wherein said mounting means rigidly mounts said control lever to the thumb lever for rotation of said thumb lever corresponding to rotation of the control lever, a flexible push/pull cable having first and second opposite ends, said control lever adapted for mounting to said first end of said push/pull cable, a manually operable remote throttle actuator adapted for mounting to said second end of said push/pull cable, said remote throttle actuator including means for selectively pushing and pulling said push/pull cable, when said remote throttle actuator is mounted to said second end of said push/pull cable, so as to respectively remotely push or pull said control lever to thereby selectively rotate said control lever whereby the thumb lever is actuated, wherein said remote throttle actuator is mounted to a handle adapted for grasping and pulling by a user and wherein a tether is mounted to said handle, said tether adapted for releasable mounting to a ski of the snowmobile.

2. The device of claim 1 wherein said handle is elongate and rigid so as to be adapted for grasping by both hands of a user, and wherein said tether is mounted to said handle generally medially along the length of said handle, whereby said user grasps said handle on either side of said tether.

3. The device of claim 1 wherein said tether is of sufficient length to allow said user to stand substantially upright when the tether is mounted to the ski and the handle is grasped by the user with both hands.

4. The device of claim 1 wherein said tether includes a hook at a distal end of said tether, distal from said handle, said hook for hooking onto the ski.

5. The device of claim 1 wherein said push/pull cable is slidably mounted in a cable conduit and wherein said means for selectively pushing and pulling said push/pull cable comprises a pivotable member pivotally mounted to said handle about a pivot on said handle, said second end of said push/pull cable mounted to a first end of said pivotable member, an opposite second end of said pivotable member manually operable so as to rotate said pivotable member about said pivot relative to said handle to thereby push or pull said second end of said push/pull cable respectively into or from said cable conduit thereby respectively extending or retracting said first end of said push/pull cable respectively from or into said cable conduit to rotate said control lever.

6. The device of claim 1 wherein said control lever is an elongate lever arm adapted to be mountable at a first end thereof to a free end of the thumb lever, an opposite second end of said control lever adapted to be mountable to said first end of said push/pull cable.

\* \* \* \* \*